United States Patent [19]

Fauth et al.

[11] 4,309,042

[45] Jan. 5, 1982

[54] QUICK-CHANGE CHUCK

[75] Inventors: Otto Fauth; Lothar Höfle, both of Ostfildern, Fed. Rep. of Germany

[73] Assignee: Otto Bilz, Werkzeugfabrik, Ostfildern, Fed. Rep. of Germany

[21] Appl. No.: 74,111

[22] Filed: Sep. 10, 1979

[30] Foreign Application Priority Data

Sep. 26, 1978 [DE] Fed. Rep. of Germany ....... 2841744

[51] Int. Cl.³ ............................................ B23B 31/22
[52] U.S. Cl. ..................................... 279/75; 279/1 B; 279/22; 279/82
[58] Field of Search ...................... 279/1 B, 75, 22, 30, 279/82

[56] References Cited

U.S. PATENT DOCUMENTS

| Re. 28,662 | 12/1975 | Bilz et al. | 279/75 |
|---|---|---|---|
| 3,552,758 | 1/1971 | Siegler | 279/75 |
| 3,633,931 | 1/1972 | Bilz | 279/75 |
| 3,658,351 | 4/1972 | Benjamin et al. | 279/1 B |
| 3,735,993 | 5/1973 | Seibert | 279/1 B |

*Primary Examiner*—Z. R. Bilinsky
*Attorney, Agent, or Firm*—Michael J. Striker

[57] ABSTRACT

The quick-change chuck is adapted to be fitted on a shank sleeve fitted is inserted to rotate therewith. A locking nut screws on the locking sleeve and a ball sleeve is carried by the shank sleeve. The ball sleeve has an annular extension piece with locking balls in an annular groove of the locking nut. A connector bush is axially displaceably held on the ball sleeve, is subject to the axial pressure of a spring, and has inner reception part and a substantially frusto-conically converging ramp face. A detent device automatically detains the connector bush in relation to the ball sleeve in its axial release position against self-effected dropping back into the locking position under the action of the spring, and on the introduction of the locking sleeve can be over-ridden with subsequent automatic axial displacement of the connector bush by means of the spring into its locking position.

16 Claims, 5 Drawing Figures

QUICK-CHANGE CHUCK

BACKGROUND TO THE INVENTION

The invention relates to a quick-change chuck, especially for a locking sleeve receiving a tool.

More especially the chuck is adapted to be fitted on a shank sleeve fitted or fittable on the machine tool, into which sleeve the locking sleeve can be inserted to rotate therewith. A locking nut screws on to the forward end of the locking sleeve, and a ball sleeve is carried by the shank sleeve and connectable with the sleeve. The ball sleeve has at its distal end an annular extension piece with locking balls held radially movably therein which can engage radially in an annular groove of the locking nut which is provided internally with inclined flanks on both sides of the locking balls. The annular extension piece with one end forms an axial stop against which the locking nut can abut with an abutment face thereon. The annular extension piece and/or the locking nut can bear each with an annular face axially against the free annular end face of the shank sleeve. A connector bush or control sleeve is axially displaceably held on the ball sleeve and is subject to the axial pressure of a spring supported against the ball sleeve, which connector bush has on the end section axially adjacent to the locking balls an inner reception part and a substantially frusto-conically converging ramp face by means of which the locking balls engage, on axial displacement of the connector bush into its locking position radially into the annular groove of the locking nut. In the case of contrary axial displacement of the connector bush into its release position the locking balls emerge radially from the annular groove liberating the locking nut with locking sleeve, and can enter the receiving part of the connector bush.

A quick-change chuck of this kind is known (Ger. Pat. Sp. No. 12 99 488).

For the insertion of a locking sleeve and for its coupling the connector bush must be drawn by hand into the release position, that is axially downwards in operation, and held in this release position against spring force during the insertion of the locking sleeve. After the insertion the connector bush can be released and then by spring force is pushed back of its own accord into its locking position, with consequent pressing of the locking balls radially into the annular groove of the locking nut. This requires both hands, namely the left hand which draws the connector bush into the release position and holds it, and the right hand which inserts the locking sleeve. This operation is quite demanding. Thus there is a limit to the reduction of the fitting and changing times. Sometimes this operation is also especially irksome, for example in the case of multi-spindle drill heads with narrow spindle intervals and poorly accessible spindles. Then sometimes little space is available for actuating the connector bush with one hand and holding and inserting the locking sleeve, or holding and withdrawing it in the case of release, with the other hand.

SUMMARY OF THE INVENTION

According to the invention there is provided a quick-change chuck, for receiving a locking sleeve adapted to hold a tool and to fit on a shank sleeve to be driven by a machine tool, into which sleeve the locking sleeve can be inserted to rotate therewith, provided with a locking nut screwable on to the forward end of the locking sleeve, and with a ball sleeve axially fittable upon the shank sleeve and connectable with the sleeve, which ball sleeve has at its distal end an annular extension piece with locking balls held radially movably therein which can engage radially in an annular groove of the locking nut which is provided internally with inclined flanks, on both sides of the locking balls, where the annular extension piece with one end forms an axial stop against which the locking nut can abut with an abutment face thereon, and the annular face of one of the annular extension pieces and the locking nut can bear axially against the free annular end face of the shank sleeve, and having a connector bush axially displaceably held on the ball sleeve and subject to the axial pressure of a spring supported against the ball sleeve, which connector bush has on the end section axially adjacent to the locking balls an inner reception part and a substantially frusto-conically converging ramp face by means of which the locking balls engage, on axial displacement of the connector bush into its locking position radially into the annular groove of the locking nut, while the locking balls in the case of contrary axial displacement of the connector bush into its release position emerge radially from the annular groove liberating the locking nut with locking sleeve, and can enter the receiving part of the connector bush, the provision of a detent device between the connector bush and the ball sleeve by means of which the connector bush is automatically detainable in relation to the ball sleeve in its axial release position against self-effected dropping back into the locking position caused under the action of the spring, and which especially on the introduction of the locking sleeve by means of external axial pressure upon the connector bush, can be over-ridden with subsequent automatic axial displacement of the connector bush by means of the spring into its locking position. By these means a still simpler and above all quicker coupling and uncoupling of the locking sleeves is rendered possible without compulsory use of both hands of the operator, especially in the case of narrow spindle intervals and poorly accessible spindles, and which thus still further simplifies the operation and renders possible a further reduction of the fitting and changing times.

This leads to genuine one-handed operation. If an inserted locking sleeve with tool is to be removed, it is merely necessary for the connector bush to be displaced with one hand from its locking position axially forwards against the action of the spring into its released position in which the connector bush is automatically detained and remains fixed by means of the detent device. This involves an uncoupling of the locking sleeve with locking nut and inserted tool. In the axial displacement of the connector bush these parts are grasped as a unit with the same hand which displaces the connector bush. The said unit then does not fall out of the shank sleeve. After removal of the locking sleeve the chuck remains in the release position. It is ready to receive the unit consisting of locking sleeve, locking nut and inserted tool. This unit is likewise grasped for insertion with only one hand, for example the right, and inserted into the shank sleeve. In the insertion as soon as the annular groove of the locking nut is situated approximately at the axial level of the locking balls and the latter can snap into it, the detained release position of the connector bush is over-ridden by axial pressure upon the latter, that is the detention is released. This can occur by axial pressure applied to the connector bush, applied for example by the thumb of the hand which inserts and holds the locking sleeve. For this purpose again the application of the other hand is not necessary. Instead the axial pressure upon the connector bush, which is especially advantageous, can also act directly from the locking nut upon the facing end of the connector bush, in insertion. The detent device thus released then liberates the connector bush. The latter is automatically displaced from the release position into the locking position in the same direction as the locking sleeve was inserted, by means of the action of the axially expanding spring. The ramp face of the connector bush then over-runs the locking balls which are in this case radially inwardly pressed into the annular groove of the locking nut. The latter and thus the locking sleeve containing the tool is then axially securely detained. Thus the coupling and uncoupling of the locking sleeves are substantially simplified and accelerated. The fitting and changing times are thereby still further shortened. The operation is entirely problem-free, especially because in the insertion of the locking sleeve no attention of any kind has to be directed to the connector bush being held by hand still axially in the release position and then released at the right time when the annular groove of the locking nut is situated in the axial zone of the locking balls. Thus this special application of observation necessary hitherto is entirely eliminated. The one-handed operation facilitates the coupling and uncoupling of the locking sleeves especially in the case of narrow spindle intervals and poorly accessible spindles. There is always still sufficient room there for only one necessary hand.

BRIEF DESCRIPTION OF DRAWINGS

The invention is explained in greater detail below with reference to examples of embodiment shown in the drawings, wherein:

FIG. 3 shows an enlarged detail III of FIG. 1, FIGS. 4 and 5 each show a section of the left part of a chuck in the release position according to a second and a third example of embodiment respectively.

DESCRIPTION OF PREFERRED EMBODIMENTS

Figure 1:
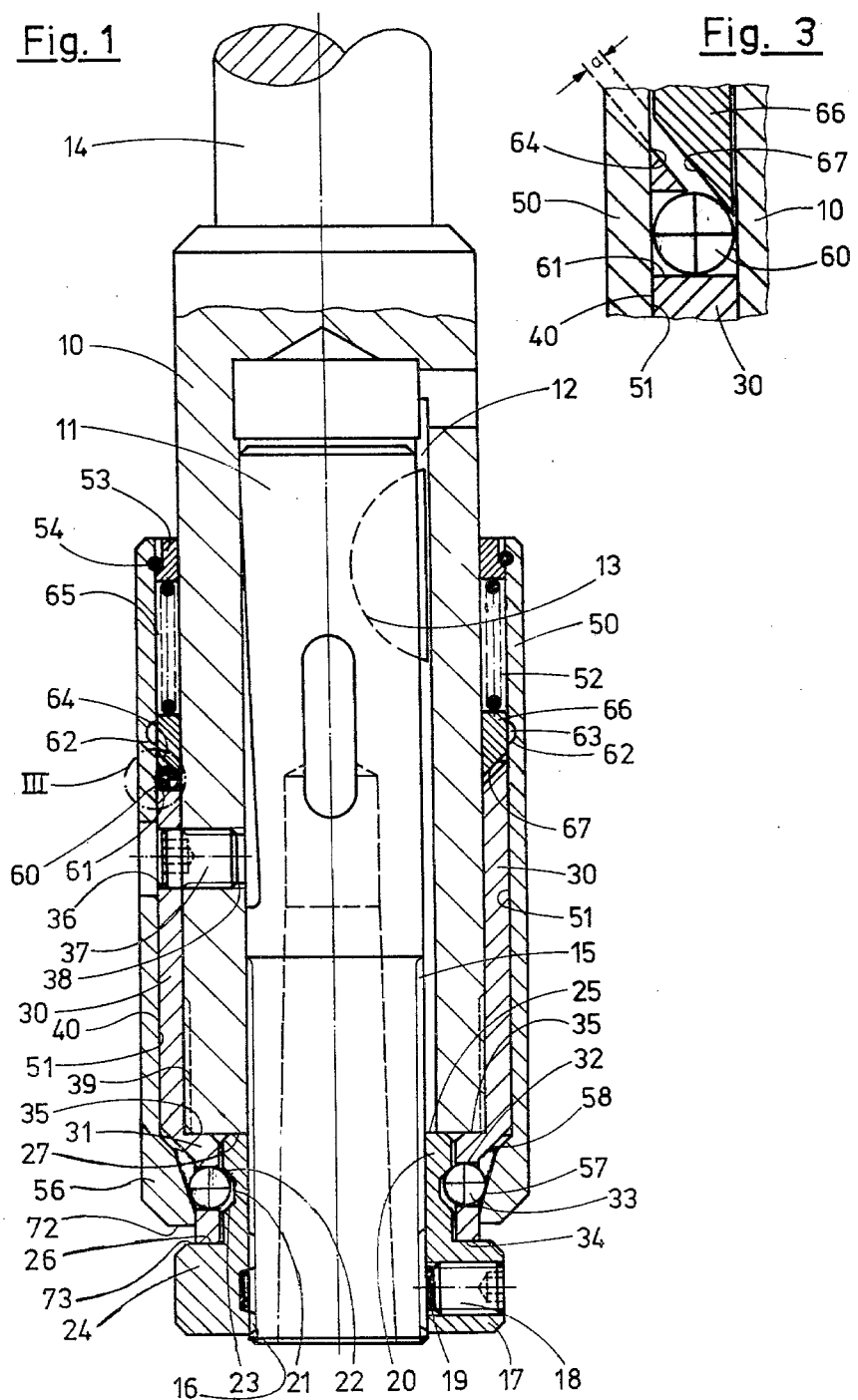
FIGS. 1 and 2 each show a diagrammatic longitudinal section of a quick-change chuck according to a first example of embodiment, fitted on to a shank sleeve and with inserted locking sleeve, in the locking position and in the release position respectively.

In all examples of embodiment, a locking sleeve 11 receiving the tool can be pushed into a cylindrical shank sleeve 10 and is driven therein in the direction of rotation through groove 12 and key 13. The shank sleeve 10 is for example a component of the spindle head of the machine or at the rearward end, as indicated, it carries a shank 14 which is formed for example as a Morse taper shank, a steep angle cone shank or special shank of other type, or the shank sleeve 10 with shank 14 is a component of an adaptor which in turn can be accommodated in the spindle head on the machine (not shown).

The locking sleeve 11 has at the forward end a threading 15 on to which a locking nut 17 is screwable with threading 16. The locking nut 17 contains a threaded pin 18 and a circlip 19. On a cylindrical shank 20 the locking nut 17 carries an annular groove 21 with flanks 22 and 23 rising on both sides. The cylindrical shank 20 carries at the end pointing upwards in FIG. 1 an axial annular surface 25. In the opposite direction the cylindrical shank 20 is adjoined by a shoulder 24 of larger diameter with axial stop face 26 pointing towards the cylindrical shank 20.

At the free end the shank sleeve 10 carries an annular end face 27.

Figure 2:
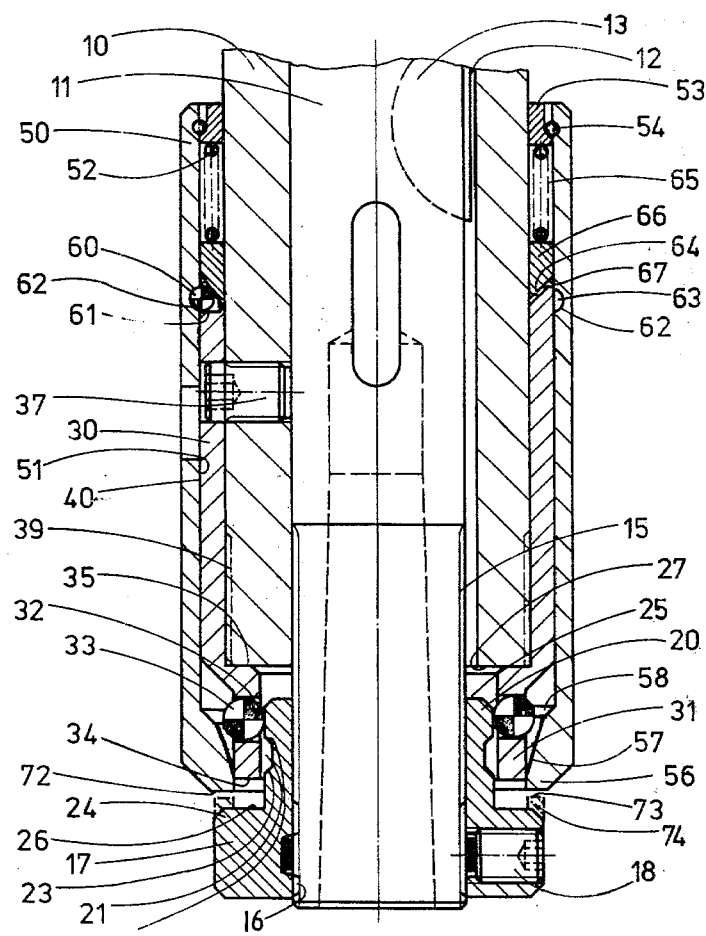

The chuck in FIGS. 1 to 3 further comprises a ball sleeve 30 which carries an annular extension piece 31 at its forward end. The annular extension piece 31 contains several radial passage bores 32 in each of which a locking ball 33 is radially movably held. These balls in the locking position (FIG. 1) engage in the annular groove 21 of the locking nut 17 so that the latter is axially non-displaceably connected with the shank sleeve 10. In the release position (FIG. 2) the locking balls 33 are out of engagement with the annular groove 21.

The annular extension piece 31 forms with its lower end face a flat axial abutment 34 against which—according to dimensioning of the quick-change chuck—the locking nut 17 can abut with its facing annular surface 26 in the locking position according to FIG. 1.

The annular extension piece 31 protrudes radially inwards, that is to say it is smaller in diameter than the shank sleeve 10 but larger than the cylindrical shank 20 of the locking nut 17. In the transition region to the annular extension piece 31 the latter carries an axial annular surface 35.

According to the dimensioning of the quick-change chuck the annular extension piece 31 and/or the locking nut 17 can each bear with the annular surface 35 and 25 respectively axially against the free end face 27 of the shank sleeve 10, while the locking nut 17 can abut with its stop face 26 against the end axial stop 34. The above-described relates to the locking position according to FIG. 1. In the release position according to FIG. 2 the ball sleeve 30 can bear with the annular surface 35 axially on the end face 27.

The ball sleeve 30 is connected and axially secured with the shank sleeve 10 in that in a bore 36 of the ball sleeve 30 there engages a slotted headless screw 37 which is screwed into a threaded bore 38 of the shank sleeve 10. Instead the ball sleeve 30, as indicated in chain lines in FIGS. 1 and 2, can also be screwed with internal threading on to a terminal external threading 39 of the shank sleeve 10. It is further understood that the shank sleeve 10 can carry on the axial length section on which it is grasped over by the ball sleeve 30 a step of smaller diameter, instead of having the same diametric measurement throughout in the axial direction.

Moreover an external connector bush or control sleeve 50 is a component of the quick-change chuck. This bush is held axially displaceably with its inner wall 51 on the outer wall 40 of the ball sleeve 30. It is subject to the axial pressure of a rear spring 52 arranged at the top in FIG. 1. To support the spring 52 at the upper end in FIG. 1 between the inner wall 51 of the connector bush 50 and the outer wall of the shank sleeve 10 there is a stop ring 53 which is held on the connector bush 50 either by means of a securing ring 54 or by means of a threading. The other end of the spring 52 is indirectly supported axially on the ball sleeve 30.

At the forward end the connector bush 50 carries an end section 56 which contains in the interior an oblique annular ramp surface 57, narrowing somewhat frusto-conically towards the end, and a larger inner receiving part 58. By means of the ramp surface 57 the locking balls 33 are pressable radially into the annular groove 21, while in the case of contrary axial displacement of the connector bush 50 the locking balls 33 come radially out of the annular groove 21 releasing the locking nut 17 with locking sleeve 11, and find sufficient space within the receiving part 58.

Between the connector bush 50 and the ball sleeve 30 a detent device is arranged in the interior. By means of the detent device the connector bush 50 is automatically detainable in relation to the ball sleeve 30 in its axial release position (FIG. 2), against dropping back into the locking position (FIG. 1). Especially in the introduction of the locking sleeve 11 into the shank sleeve 10, the detent device can be over-ridden by means of an axial pressure applied from below upwards in FIG. 1 to the connector bush 50, with consequent subsequent automatic axial displacement of the connector bush 50 by means of the spring 52 into its locking position according to FIG. 1. The axial pressure can be applied by hand or by means of the locking nut 17 simultaneously with the introduction of the locking sleeve 11. This thus renders possible a genuine one-handed operation. If in fact the locking sleeve 11 with locking nut 17 and tool held therein, starting from the locking position according to FIG. 1, is to be detached from the quick-change chuck, it is merely necessary for the connector bush 50 to be displaced axially against the action of the spring 52, namely from above downwards in FIG. 1, and thus from the locking position into the release position according to FIG. 2. Then the connector bush 50 automatically engages in this release position according to FIG. 2. Thus the connector bush 50 does not have to be held by hand in this release position. The locking sleeve 11 with locking nut 17 and tool situated in the interior of the locking sleeve 11 can be drawn out of the shank sleeve 10. The quick-change chuck remains in the release position and is ready for the insertion of a different locking sleeve 11. In the insertion, as intermediate position there occurs the position according to FIG. 2, before the locking balls 33 engage in the annular groove 21. Further axial pushing in of the locking sleeve 11 leads, either for example by means of the stop face 26 or by manual application, to an axial pressure loading of the connector bush 50. Thus the detent device is over-ridden with simultaneous further pushing in of the locking sleeve 11. The connector bush 50 is set back upwards axially in FIG. 2 by means of the expanding spring 52. The oblique ramp face 57 in the end section 56 then presses the locking balls 33 radially inwards into the annular groove 21 of the locking nut 17.

The detent device comprises within the ball sleeve 30 several detent balls 60 grouped in the circumferential direction which are radially movably seated in associated radial bores 61 at the end of the ball sleeve 30.

Furthermore an axial detent shoulder 62 on the inner wall 51 of the connector bush 50 is a component of the detent device. The detent shoulder 62 faces the spring 52. On axial displacement of the connector bush 50 into its release position according to FIG. 2 the detent balls 60 engage in locking and shape-engaging manner on the detent shoulder 62. The detent shoulder 62 is formed by the wall of an inner annular recess 63, which is formed as an annular groove of arcuate cross-section, the radial depth of which is at least slightly smaller than the radius of the detent balls 60. The annular shoulder surface of the annular groove 63 in the displacement of the connector bush 50 into its release position according to FIG. 2 firstly passes the detent balls 60.

When the connector bush 50 is in the locking position (FIG. 1), the detent balls 60 are pressed by its inner wall 51 radially into their radial bores 61 against the action of their spring loading. In the release position (FIG. 2) the detent balls 60 are firstly over-run by the detent shoulder 62 of the annular groove 63, whereafter the detent balls 60 under the action of their spring-loading engage radially behind the detent shoulder 62 in the annular groove 63 of the connector bush 50 (FIG. 2) and thus detain the connector bush 50 in this release position so that the connector bush 50 cannot drop back of its own accord from the release position (FIG. 2) into the locking position (FIG. 1) under the action of the stressed spring (52).

The ball sleeve 30 has at the end an oblique annular surface 64 which has a frusto-conical configuration with direction of taper towards the annular extension piece 31. The oblique annular surface 64 extends into the axial zone of the radial bores 61 in such a way that the detent balls 60, in the locking position (FIG. 1) of the connector bush 50, protrude radially inwards beyond the surface of the oblique annular surface 64. The amount of overhang is entered diagrammatically by a in FIG. 3.

In the annular zone 65 of the spring 52 a thrust ring 66 is arranged which is movable along the inner wall 51 of the connector bush 50 and along the outer wall of the shank sleeve 10. The facing end of the spring 52 bears axially on the thrust ring 66 as spring loading for the detent balls 60. The thrust ring 66 is pressed substantially axially against the detent balls 60 with a wedge annular face 67. The wedge annular surface 67 corresponds in configuration at least substantially to the oblique annular surface 64.

The end section 56 of the connector bush 50 and the locking nut 17 each have stop faces 72 and 73 respectively, facing one another, on their side facing the end section 56. The stop face 72 is formed for example by the free lower end surface in FIG. 1 of the connector bush 50, while the stop face 73 is seated on the outer annular zone of the shoulder 24 of the locking nut 17, for example at the same axial level as the stop faces 26 there. In the introduction of the locking sleeve 11 with locking nut 17 and contained tool into the shank sleeve 10 and with the connector bush 50 situated in the release position according to FIG. 2, then the stop face 73 strikes axially on the stop face 72, so that when the locking sleeve 11 is inserted the connector bush 50 is automatically shifted from its release position (FIG. 2) into its locking position (FIG. 1). So that this can happen, the end section 56 of the connector bush 50 extends with an end step with end face there in the form of the stop face 72 into the axial path of displacement of the locking nut 17. On the part of the locking nut 17 the stop face 73 is formed by a facing axial annular surface which on insertion of the locking sleeve 11 can also actually abut on the stop face 72 of the connector bush 50. The stop faces 72 and 73 lie on the same diameter zone. The stop face 73 is situated in the region of the shoulder 24. In FIG. 2 it is indicated in chain lines that the locking nut 17 can also comprise on its side facing the connector bush 50 a specially stepped outer stop shoulder 74 facing the end step 56 by the end face of which shoulder then the connector bush 50 can be charged axially. Then the connector bush 50 can be made either shorter or stepped in the axial direction in the region of the end section 56. It is self-evident that even other stop elements, held on the locking nut 17, can exert this automatic stop function, for example distance rings, pins, screws or other protuberances. The kinematic reversal is also within the scope of the invention, that is the arrangement of appropriate stop elements on the end section 56 of the connector bush 50, instead of on the locking nut 17.

Figure 4:
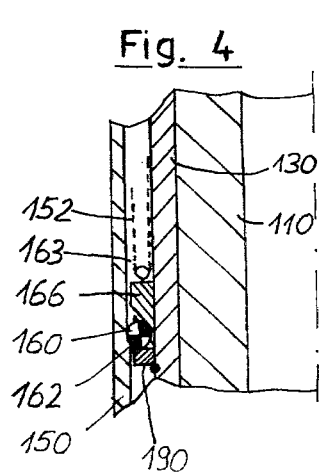

In the second example of embodiment in FIG. 4 the detent balls 160 are held in a special ball ring 190 which is made fast on the ball sleeve 130 by means of a circlip so that it cannot be shifted axially in the release direction. The detent shoulder 162 is seated on the end of a cylindrical aperture 163 in the connector bush 150. The function corresponds to that of the chuck in FIGS. 1 to 3.

Figure 5:
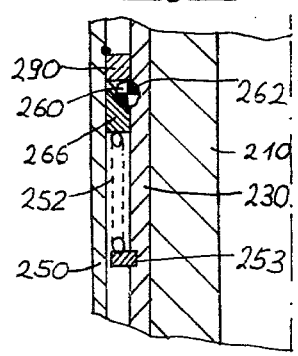

The third example of embodiment in FIG. 5 shows the kinematic reversal of the embodiment in FIGS. 1 to 4. The annular groove with detent shoulder 262 is seated in the ball sleeve 230, on which the spring 252 is also supported axially through an inserted stop ring 253. The ball ring 290 with the detent balls 260 therein is made fast axially on the connector bush 250 by means of a circlip. The wedge annular face of the thrust ring 266 points with the cone apex downwards to the locking nut and is deepened. The oblique annular face of the ball ring 290 points in the same direction. The remainder of the configuration is the same as in FIGS. 1 to 3.

We claim:

1. A quick-change chuck, comprising a shank sleeve arranged to be driven by a machine spindle and having an axis and a free annular end face; a locking sleeve arranged to hold a tool and inserted in the shank sleeve to rotate therewith, the locking sleeve having a forward end; a locking nut screwed on the forward end of the locking sleeve and having an annular face which can bear axially against the free annular end face of the shank sleeve, the locking nut having an abutment face and an annular groove with internal inclined flanks; a ball sleeve axially fitted on the shank sleeve and connected with the latter, the ball sleeve having a distal end and an annular extension piece at the distal end, the annular extension piece having one end forming an axial stop against which the locking nut can abut with the abutment face thereof, the annular extension piece having an annular face which can bear axially against the free annular end face of the shank sleeve; locking balls held radially movable in the extension piece of the ball sleeve and engageable radially in the annular groove of the locking nut between the inclined flanks of the latter; a control sleeve axially displacably held on the ball sleeve and having an end section which is axially adjacent to the locking balls and has an inner receiving part and a substantially frustoconically converging ramp face by means of which the locking balls engage, on axial displacement of the control sleeve into its locking position, radially into the annular groove of the locking nut, while the locking balls in the case of contrary axial displacement of the control sleeve into its release position, emerge radially from the annular groove liberating the locking nut with the locking sleeve and can enter the receiving part of the control sleeve; a spring located between the control sleeve and the ball sleeve and urging the former relative to the latter; a detent device arranged between the control sleeve and the ball sleeve so that the control sleeve is automatically detained in relation to the ball sleeve in its axial release position against self-effected dropping back into the locking position under the action of the spring, the detent device on introduction of the locking sleeve by means of external axial pressure upon the control sleeve can be overridden with subsequent automatic axial displacement of the control sleeve under the action of the spring into its locking position; and means for displacing the control sleeve from its release position into its locking position, the end section of the control sleeve having a first stop face, and the locking nut having an end section provided with a second stop face which faces toward the first stop face of the end section of the control sleeve, the stop faces being arranged so that upon the introduction of the locking sleeve with the locking nut the second stop face of the locking nut abuts against the first stop face of the control sleeve and displaces the latter in an axial direction from its release position into its locking position so as to form the displacing means.

2. A quick-change chuck according to claim 1, wherein said detent device comprises at least one radially movable detent member biased by said spring carried by the ball sleeve and an inner axial detent shoulder, which is disposed towards the end of the control sleeve opposite to the end section, on the control sleeve, and on which the detent member engages in locking and shape-engaging manner on axial displacement of the control sleeve into its release position.

3. A quick-change chuck according to claim 2, wherein the detent shoulder of the control bush is formed by the wall of at least one detent recess approximately axially adjacent to the detent member.

4. A quick-change chuck according to claim 3, wherein the detent recess of the control sleeve formed as internal annular recess, while the detent shoulder is formed by that annular shoulder face of the annular recess which in the displacement of the control sleeve into its release position firstly passes and over-runs the detent member.

5. A quick-change chuck according to claim 2, wherein detent members in the form of detent balls are provided which in the locking position of the control sleeve are pressed by its inner wall radially inwards against the action of the spring and in the release position are firstly over-run by the detent shoulder of the control sleeve and engage under the action of the spring radially behind the detent should into the detent recess of the control sleeve.

6. A quick-change chuck according to claim 5, wherein the detent recess is formed as an annular groove of arcuate cross-section the radial depth of which is dimensioned at least slightly smaller than the radius of the detent balls.

7. A quick-change chuck according to claim 5, wherein the detent balls are radially movably held in radial bores of the ball sleeve.

8. A quick-change chuck according to claim 5, wherein the detent balls are radially movably held in radial bores in a ball ring made fast axially in the release direction on the ball sleeve.

9. A quick-change chuck according to claim 5, wherein the detent balls are radially movably held in radial bores formed in the control sleeve.

10. A quick-change chuck according to claim 4, wherein the annular recess of the control sleeve is formed as internal cylindrical recess with substantial axial extent, extending approximately to the end of the connector bush opposite to the end section.

11. A quick-change chuck, comprising a shank sleeve arranged to be driven by a machine spindle and having an axis and a free annular end face; a locking sleeve arranged to hold a tool and inserted in the shank sleeve to rotate therewith, the locking sleeve having a forward end; a locking nut screwed on the forward end of the locking sleeve and having an annular face which can bear axially against the free annular end face of the shank sleeve, the locking nut having an abutment face and an annular groove with internal inclined flanks; a ball sleeve axially fitted on the shank sleeve and connected with the latter, the ball sleeve having a distal end and an annular extension piece at the distal end, the annular extension piece having one end forming an axial stop against which the locking nut can abut with the abutment face thereof, the annular extension piece having an annular face which can bear axially against the free annular end face of the shank sleeve, the ball sleeve having radial bores; locking balls held radially movable in the extension piece of the ball sleeve and engageable radially in the annular groove of the locking nut between the inclined flanks of the latter; a control sleeve axially displacably held on the ball sleeve and having an end section which is axially adjacent to the locking balls and has an inner receiving part and a substantially frustoconically converging ramp face by means of which the locking balls engage, on axial displacement of the control sleeve into its locking position, radially into the annular groove of the locking nut, while the locking balls in the case of contrary axial displacement of the control sleeve into its release position, emerge radially from the annular groove liberating the locking nut with the locking sleeve, and can enter said receiving part of said control sleeve, said control sleeve having an inner wall; a spring located between the control sleeve and the ball sleeve and urging the former relative to the latter; a detent device arranged between the control sleeve and the ball sleeve so that the control sleeve is automatically detained in relation to the ball sleeve in its axial release position against self-effected dropping back into the locking position under the action of the spring, the detent device on introduction of the locking sleeve by means of external axial pressure upon the control sleeve can be overridden with subsequent automatic axial displacement of the control sleeve under the action of the spring into its locking position, the detent device including a detent shoulder and a detent recess provided in said control sleeve, and detent members which are radially movably held in the radial bores of the ball sleeve and in the locking position of said control sleeve are pressed by the inner wall of the control sleeve inward against the action of the spring, and in the release position of the control sleeve are firstly overrun by the detent shoulder of the control sleeve and engage under the action of the spring radially behind the detent shoulder into the detent recess of the control sleeve, the ball sleeve having in the region of the detent balls an end oblique annular surface of frustoconical configuration with direction of taper towards the annular extension piece, the oblique annular surface extending into the axial zone of the radial bores of the ball sleeve in such manner that the detent balls in the locking position of the control sleeve protrude radially beyond the oblique annular surface.

12. A quick-change chuck according to claim 11, wherein in the annular zone of the spring, axially adjacent to the oblique annular surface an axially movable thrust ring is arranged, on which the spring, supported with its other end of the control sleeve, bears axially as spring loading for the detent balls, while the thrust ring is pressed substantially axially against the detent balls with a thrust face facing towards the oblique annular surface and towards the detent balls which protrude beyond the oblique annular surface in the locking position of the connector bush.

13. A quick-change chuck according to claim 12, wherein the thrust face of the thrust ring is formed as a wedge annular surface which is configured in conformity with the oblique annular surface of the ball sleeve.

14. A quick-change chuck, comprising a shank sleeve arranged to be driven by a machine spindle and having an axis and a free annular end face; a locking sleeve arranged to hold a tool and inserted in the shank sleeve to rotate therewith, the locking sleeve having a forward end; a locking nut screwed on the forward end of the locking sleeve and having an annular face which can bear axially against the free annular end face of the shank sleeve, the locking nut having an abutment face and an annular groove with internal inclined flanks; a ball sleeve axially fitted on the shank sleeve and connected with the latter, the ball sleeve having a distal end and an annular extension piece at the distal end, the annular extension piece having one end forming an axial stop against which the locking nut can abut with the abutment face thereof, the annular extension piece having an annular face which can bear axially against the free annular end face of the shank sleeve; locking balls held radially movable in the extension piece of the ball sleeve and engageable radially in the annular groove of the locking nut between the inclined flanks of the latter; a control sleeve axially displacably held on the ball sleeve and having an end section which is axially adjacent to the locking balls and has an inner receiving part and a substantially frusto-conically converging ramp face by means of which the locking balls engage, on axial displacement of the control sleeve into its locking position, radially into the annular groove of the locking nut, while the locking balls in the case of contrary axial displacement of the control sleeve into its release position, emerge radially from the annular groove liberating the locking nut with the locking sleeve and can enter the receiving part of the control sleeve; a spring located between the control sleeve and the ball sleeve and urging the former relative to the latter; a detent device arranged between the control sleeve and the ball sleeve so that the control sleeve is automatically detained in relation to the ball sleeve in its axial release position against self-effected dropping back into the locking position under the action of the spring, the detent device on introduction of the locking sleeve by means of external axial pressure upon the control sleeve can be overridden with subsequent automatic axial displacement of the control sleeve under the action of the spring into its locking position, the end section of the control sleeve having an end step which protrudes into the axial displacement path of the locking nut and has an end face forming the first stop face, the locking nut having an axial annular surface facing toward the end face of the end step of the control sleeve and forming the second stop face; and means for displacing the control sleeve from its release position into its locking position, the stop faces being arranged so that upon the introduction of the locking sleeve with the locking nut the second stop face of the locking nut abuts against the first stop face of the control sleeve and displaces the latter in an axial direction from its release position into its locking position so as to form the displacing means.

15. A quick-change chuck according to claim 14, wherein the end face of the end step of the control sleeve extends at least over such a diameter width over which the axial facing annular surface of the lock nut also extends.

16. A quick-change chuck according to claim 14, wherein the locking nut has on its side facing the control sleeve an external stop shoulder facing the end step with end face of the control sleeve, by which shoulder the control sleeve can be loaded with axial thrust on its end face.

* * * * *